(12) United States Patent
Ramaglia et al.

(10) Patent No.: US 11,833,993 B2
(45) Date of Patent: Dec. 5, 2023

(54) POSTPROCESSING OF SEAT BELTS FOR ADDING DYE

(71) Applicant: JOYSON SAFETY SYSTEMS ACQUISITION LLC, Auburn Hills, MI (US)

(72) Inventors: Joshua Ramaglia, Auburn Hills, MI (US); Jason Lisseman, Auburn Hills, MI (US); David Wilson, Auburn Hills, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 17/565,006

(22) Filed: Dec. 29, 2021

(65) Prior Publication Data
US 2022/0203925 A1    Jun. 30, 2022

Related U.S. Application Data

(60) Provisional application No. 63/132,705, filed on Dec. 31, 2020.

(51) Int. Cl.
*B41M 5/00*    (2006.01)
*B41M 5/52*    (2006.01)
(Continued)

(52) U.S. Cl.
CPC .............. *B60R 22/12* (2013.01); *B23K 26/40* (2013.01); *B41M 5/0011* (2013.01);
(Continued)

(58) Field of Classification Search
CPC . B60R 22/12; B60R 22/48; B60R 2022/4808; B60R 2022/485;
(Continued)

(56) References Cited

U.S. PATENT DOCUMENTS 10,472,742 B1 * 11/2019 May ..................... D02G 3/441
11,384,463 B2 * 7/2022 Sights ................ D06B 11/0096
(Continued)

FOREIGN PATENT DOCUMENTS

CN     107284402 A  * 10/2017 ....... B60R 21/01548
KR  20220127291 A  *  9/2022
(Continued)

OTHER PUBLICATIONS

Description Translation for WO 2020/104352 from Espacenet (Year: 2020).*
Description Translation for CN 107284402 from Espacenet (Year: 2017).*

*Primary Examiner* — Jason D Shanske
*Assistant Examiner* — Daniel M. Keck
(74) *Attorney, Agent, or Firm* — Meunier Carlin & Curfman LLC

(57) ABSTRACT

Methods for marking a seat belt webbing with an infrared compound are described herein. The methods comprise ablating a surface of the seat belt webbing by directing one or more laser pulses toward the seat belt webbing; and coating the ablated surface of the seat belt webbing with the infrared compound, wherein the infrared compound increases absorptivity or reflectivity of the seat belt webbing to infrared radiation. Methods for optically monitoring operation of the seat belt webbing in a vehicle and distinguishing between proper positioning and improper positioning of the seat belt webbing are also disclosed.

19 Claims, 5 Drawing Sheets

(51) Int. Cl.
*G06V 10/60* (2022.01)
*B60R 22/48* (2006.01)
*B60R 22/12* (2006.01)
*B23K 26/40* (2014.01)
*B23K 103/00* (2006.01)

(52) U.S. Cl.
CPC ........... *B41M 5/5281* (2013.01); *B60R 22/48* (2013.01); *G06V 10/60* (2022.01); *B23K 2103/38* (2018.08); *B60R 2022/485* (2013.01); *B60R 2022/4866* (2013.01)

(58) Field of Classification Search
CPC ............ B60R 2022/4866; B23K 26/40; B23K 2103/38; B41M 5/0011; B41M 5/50; B41M 5/5263; B41M 5/5281; B41M 5/24; G06V 10/60; G06V 20/59; H04N 5/247; G06T 7/557; D03D 1/0005
See application file for complete search history.

(56) References Cited

U.S. PATENT DOCUMENTS

2005/0263992 A1\* 12/2005 Matsuda ........... B60R 21/01534
280/735
2009/0128860 A1\* 5/2009 Graushar ............... G06F 3/1282
358/3.28
2018/0272987 A1\* 9/2018 Cuddihy ................. B60R 22/34
2018/0326944 A1\* 11/2018 Cech ................. B60R 21/01512

FOREIGN PATENT DOCUMENTS

WO WO-2018188899 A1 \* 10/2018 ........... B23K 26/032
WO WO-2020104352 A1 \* 5/2020 ....... B60R 21/01538
WO 2020206456 A1 10/2020

\* cited by examiner

POSTPROCESSING OF SEAT BELTS FOR ADDING DYE

CROSS-REFERENCE TO RELATED APPLICATIONS

This application claims the benefit of U.S. provisional patent application No. 63/132,705, filed Dec. 31, 2020, and titled "POSTPROCESSING OF SEAT BELTS FOR ADDING DYE," the disclosure of which is expressly incorporated herein by reference in its entirety.

TECHNICAL FIELD

The disclosure presented herein relates to optical detection of a seat belt within a vehicle cabin such as to locate, identify, and highlight seat+belt assemblies therein to confirm seat belt use and seat belt positions; and more particularly to methods for applying an optical dye to seat belts to distinguish between different seat belt positions.

BACKGROUND

Seat belts are standard equipment for almost every kind of vehicle in which occupants are transported in today's transportation systems. Not only are original equipment manufacturers (OEMs) required to meet strict standards for seat belt engineering and installation, but in many scenarios, vehicle occupants are required to wear seat belts as a matter of law. Even with manufacturing regulations and use laws in place, however, overall vehicle safety is entirely dependent upon vehicle occupants using seat belts properly. Visual inspection by outside authorities is not completely reliable given that a vehicle interior is only partially visible from outside of a vehicle. Individuals attempting to circumvent seat belt use laws also position seat belts inside a vehicle in a way that gives an appearance of seat belt use but allows the vehicle occupant more latitude in range of movement (i.e., fastening the seat belt behind the user's back or pulling the seat belt only partially across the user's body and manipulating the seat belt spool to maintain the seat belt in an extended position without requiring a fixed latching).

Prior methods of seat belt monitoring can be effective but can also be spoofed. As noted above, individuals continue to engage in improper seat belt buckling behind or under the occupant, attaching buckle surrogates without using the seat belt, and maneuvering themselves out of the seat belt, particularly the shoulder strap, by hand. Furthermore, many rear seating locations do not currently use seat belt switches, belt payout sensors, or belt tension sensors. It may be difficult to install the necessary electronics in adjustable and movable seating locations to support buckle switches, payout or tension sensors as aftermarket control hardware. Thus, a need continues to exist in the vehicle market for control systems that monitor vehicle occupants for proper seat belt use and provide seat belt use and position data.

In response to that desire, optical imaging systems have been developed that produced an electronic image of the seating area in the motor vehicle and analyzed that image to detect the presence and size of an occupant. WO 2020/206456 describes such a motor vehicle occupant detection system. These systems may use near infrared (NIR) light to illuminate the vehicle, while an image is being acquired.

Currently, seat belts are dyed and sealed with anti-abrasive and/or anti-wicking coatings to prevent damage due to mechanical wear and chemical interactions. While this is good for consumer product that will encounter various chemical and mechanical stresses throughout its life, this specific process of seat belt manufacturing requires significant modification if anyone wants to make customizations to the seat belt, such as making belt patterns with novel dyes for specific purposes.

A need exists in the vehicle market for development of new seat belt, specifically one which includes patterns with dyes and pigments. A need also exists for methods of applying dyes and pigments to a manufactured seat belt. The systems and methods disclosed herein address these and other needs.

BRIEF SUMMARY

Methods for marking a seat belt webbing with an infrared compound are provided herein. The methods can comprise ablating a surface of the seat belt webbing by directing one or more laser pulses toward the seat belt webbing; and coating the ablated surface of the seat belt webbing with the infrared compound, wherein the infrared compound increases absorptivity or reflectivity of the seat belt webbing to infrared radiation. The seat belt webbing is typically a woven textile.

The seat belt webbing can be derived from polyamide, polyolefin, polyester, polyether, polycarbonate, polyurethane, or a combination thereof. In example embodiments, the seat belt webbing is derived from polyester.

The seat belt webbing can comprise a pre-coat rendering the seat belt webbing waterproof and/or anti-abrasive. For example, the seat belt webbing can include a pre-coat of a polymer elastomer, such as silicone, a polyester or polyether-based polyurethane, a polycarbonate-based polyurethane, a copolymer blend of ethylene vinyl acetate and an isocyanate, or a combination thereof. The pre-coat can have a thickness of about 0.1 mil or greater.

As described herein, the surface of the seat belt webbing is ablated using one or more laser pulses. The method can comprise directing the one or more laser pulses to ablate the seat belt webbing in a predetermined pattern.

The infrared compound used to coat the ablated surface can be selected from an infrared absorptive compound, an infrared reflective compound, or the infrared compound absorbs and reflects infrared light. The infrared compound can be provided in a carrier selected from vinyl printing ink, acrylic lacquer, polyurethane, or polyurethane lacquer. Coating the ablated surface of the seat belt webbing can be performed by a rolling mill, roller, brush, mask, dip coating, spin coating, and/or spray coating. The coating can be applied in a predetermined pattern. Preferably, the seat belt webbing maintains greater than 95% of its tensile strength, elongation, mass, width, thickness, curvature, colorfastness, or a combination thereof, after marking with the infrared compound.

Methods for optically monitoring operation of a seat belt webbing are also provided. The methods can comprise illuminating the seat belt webbing with electromagnetic radiation using at least one illumination device, wherein the seat belt webbing is marked with an infrared compound as disclosed herein and has at least one pattern that absorbs or reflects the electromagnetic radiation; obtaining images of the illuminated seat belt webbing using at least one image obtaining device; and analyzing the images to determine proper positioning of the seat belt webbing relative to an occupant or derive a measure of the occupant's vital signs.

The pattern may comprise a size, shape, or absorptiveness/reflectivity configured to distinguish various patterns in the images. In example embodiments, the presence in the image of a pre-determined pattern indicates the seat belt webbing relative to the occupant within the vehicle is properly positioned. In other example embodiments, the absence in the image of a pre-determined pattern indicates the seat belt webbing relative to the occupant within the vehicle is improperly positioned.

Analyzing the images can comprise comparing at least two images and tracking movement of the seat belt webbing. Accordingly, vital signs such as a respiration rate of the occupant can be monitored over time and a determination of whether the occupant has an irregular respiration rate can be made. The occupant can be a driver and the method can comprise analyzing the driver's respiration rate over time to determine whether the driver has lost the ability to continue to control the vehicle.

In the methods of optically monitoring operation of the seat belt, the methods can further comprise triggering an alarm within the vehicle based on the positioning of the seat belt webbing relative to the occupant or the occupant's vital signs.

Methods by which a camera image system in a vehicle distinguishes between proper positioning and improper positioning of a seat belt webbing are also disclosed. The method can comprise marking the seat belt webbing with an infrared compound as disclosed herein, wherein the mark comprises at least one pattern that absorbs or reflects electromagnetic radiation; producing an image in response to infrared radiation absorbed or reflected by the seat belt webbing relative to an occupant within the vehicle; and distinguishing between the proper positioning and improper positioning of the seat belt webbing in the image based on the at least one pattern. The presence of a pre-determined pattern in the image indicates the seat belt webbing is properly positioned relative to an occupant within the vehicle, and absence of the pre-determined pattern in the image indicates improper positioning of the seat belt webbing.

DETAILED DESCRIPTION

Figure 1:
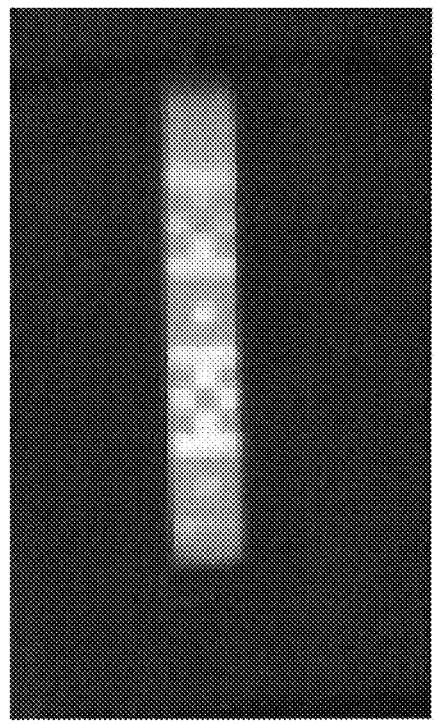
FIG. 1 is an intensity image showing the pattern of light reflected from a seat belt from just etching the surface sealant off the webbing.
Figure 2:
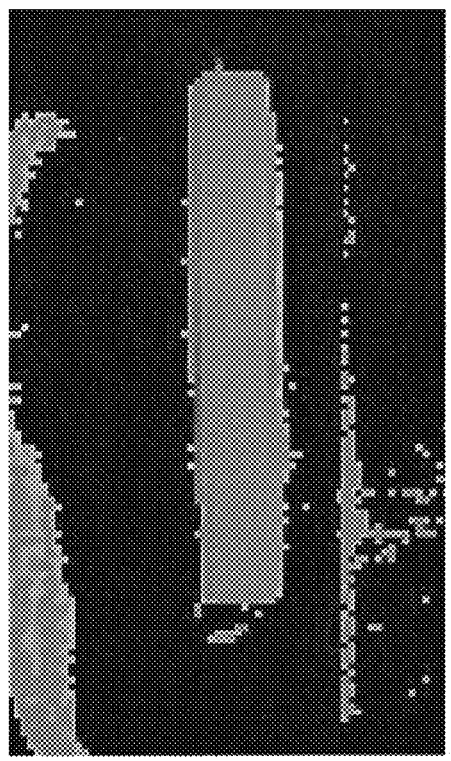
FIG. 2 is a depth image showing the even depth of a seat belt with a pattern etched onto the surface.

This disclosure relates to seat belt webbings and methods for marking a seat belt webbing with an infrared compound.

The infrared compound increases absorptivity and/or reflectivity of the seat belt webbing to infrared radiation but does not substantially alter absorptivity or reflectivity of the seat belt webbing to visible light. Illumination of the infrared compound allows operation of an occupant detection system to determine proper seat belt positioning relative to an occupant.

By using manufactured seat belt webbings for marking with the infrared compound, various mechanical, chemical, and absorptive properties may already be secured, which do not facilitate applying new markings on the seat belt. The term "manufactured" as used herein refers to a seat belt webbing which has been modified to improve the webbing's mechanical properties such as abrasion resistance, chemical resistance, heat and light resistance, anti-wicking or water proofing properties, frictional resistance, impact absorption, lubricating properties, strength retention, or a combination thereof. Disclosed herein are methods for application of markings to a seat belt webbing, preferably a manufactured seat belt webbing.

In general, the seat belt webbing for marking is a woven textile. The webbing can be in the form of a plain weave, a twill weave, a satin weave, a Raier loom, an air jet loom, a water jet loom, or the like.

The seat belt webbing can be derived from any suitable material, including polyamides, polyolefins, polyesters, polyethers, polycarbonates, polyurethanes, or a combination thereof. In some instances, polyester represented by polyethylene terephthalate (PET) is used as a main component for the seat belt webbing. The yarn for the seat belt webbing should, of course, maintain high strength, and it should also have good sliding efficiency after being manufactured into a seat belt. The seat belt webbing can have any number of woven yarns, such as 500 yarns/inch or less, 400 yarns/inch or less, or 300 yarns/inch or less, upon manufacturing a seat belt. For example, a seat belt can be made of 320 ends of 1,100 dtex polyester each. In case of nylon seat belts, 260 ends of 1670 dtex yarn can be used.

As discussed herein, the seat belt webbing prior to marking has improved mechanical properties, abrasion resistance, anti-wicking or water proofing properties, strength retention, frictional resistance, heat resistance, impact absorption, and lubricating properties, compared to the raw materials used to manufacture the seat belt webbing. For example, during the preparation of the seat belt webbing, various additives may be added in order to secure one or more mechanical, abrasion, water-proofing, heat resistance, impact absorption, or lubricating properties upon being manufactured into a seat belt. In some instances, the seat belt webbing includes a pre-coat comprising one or more additives rendering one or more desirable properties to the seat belt webbing.

The additives may be included in an amount of 30% by weight or less, 25% by weight or less, 20% by weight or less, 15% by weight or less, 10% by weight or less, 8% by weight or less, 6% by weight or less, or 5% by weight or less, based on the weight of the seat belt webbing. In some cases, the additives may be included in an amount of from 1% to 30% by weight, from 2% to 30% by weight, from 5% to 25% by weight, from 10% to 30% by weight, based on the weight of the seat belt webbing.

Particularly, the seat belt webbing may include one or more inorganic additives selected from the group consisting of $TiO_2$, $SiO_2$, $BaSO_4$, and the like. A non-water based emulsion for maximizing surface lubricity through a physical or chemical bond on the webbing surface can be included. The non-water based emulsion may include one or more selected from the group consisting of, polydimethylsiloxane, polydibutylsiloxane, polymethylphenylsiloxane, a paraffin-based lubricant, an ester-based lubricant, a nonionic activator, and an anionic activator. To improve the friction and wear resistance of the seat belt webbing, materials such as a polyketone, silicon, polytetrafluoroethylene (PTFE), calcium carbonate ($CaCO_3$), maleic acid, molybdenum, glass fiber, magnesium stearate, or a combination thereof can be used. Other suitable additives can include a polymer elastomer, such as silicone, a polyester or polyether-based polyurethane, a polycarbonate-based polyurethane, a copolymer blend of ethylene vinyl acetate and an isocyanate, or a combination thereof.

As described above, the additive can be in the form of a pre-coat on the seat belt webbing (e.g., shown as 410 in FIG. 4) and has a thickness of about 0.1 mil or greater, such as 0.15 mil or greater, 0.2 mil or greater, 0.25 mil or greater, or 0.3 mil or greater.

Figure 4:
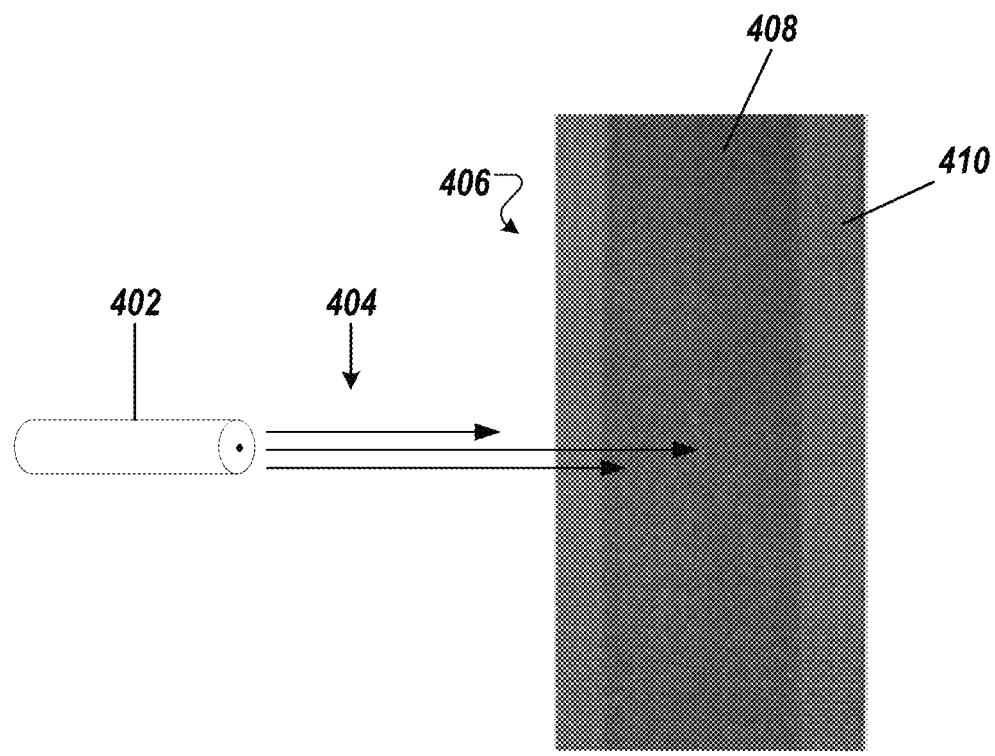
FIG. 4 is an image showing a dyed seat belt pattern having a large middle region to be dyed surrounded by an unetched region at the edges of the seat belt along with a schematic illustration of a laser producing laser pulses to ablate the surface of the seat belt webbing, according to one implementation.
Figure 7:
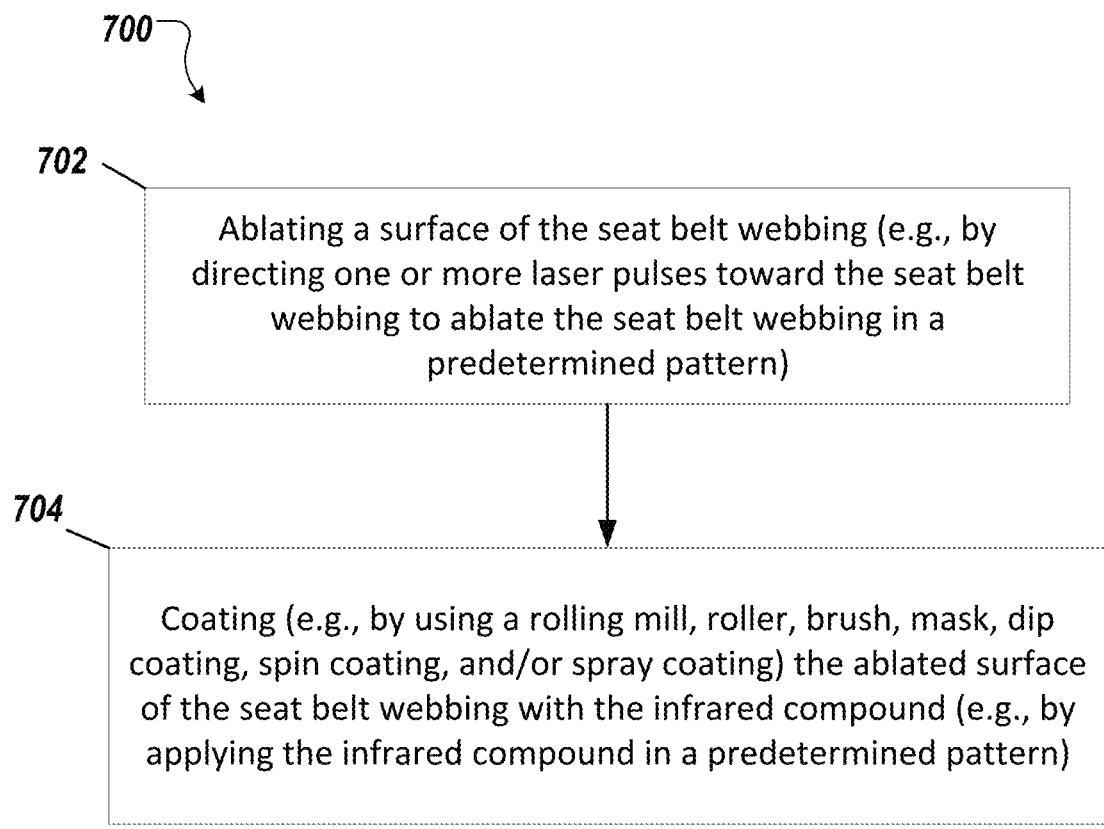
FIG. 7 is a flowchart depicting a method for marking an example seat belt webbing with an infrared compound, according to one implementation.

FIG. 7 shows a method 700 of marking the seat belt webbing 406 with an infrared dye, and FIG. 4 shows a schematic of a system for carrying out the ablation step of method 700. The method 700 begins at step 702 with ablating a surface of the seat belt webbing 406 to accelerate wear of the webbing. Ablating the surface of the webbing 406 can be carried out in a manner to produce a desired ablated pattern (e.g., shown as pattern 408) or such that the entire surface of the seat belt webbing is ablated. Preferably, the ablating technique includes the use of a laser 402. In some embodiments, the method of the present disclosure includes ablating the surface of the seat belt webbing 406 by directing a laser beam 404 produced by a laser 402 onto the webbing surface. As used herein, laser ablation refers to the process of removing material from a solid surface by irradiating it with a laser beam 404. At low laser flux, the material may be heated by the absorbed laser energy and evaporate, sublimate, or otherwise be separated from the surface by exposure to laser energy, preferably in the presence of a gas flow. At high laser flux, the material can be converted to a plasma. Usually, laser ablation refers to removing material with a pulsed laser, but it is possible to ablate material with a continuous wave laser beam if the laser intensity is high enough.

The depth over which the laser energy is absorbed, and thus the amount of material removed by a single laser pulse depends on a number of factors including, but not limited to, the material's optical properties and the laser wavelength and pulse length. The total mass ablated from the seat belt webbing per laser pulse is referred to as the ablation rate. Features of laser radiation such as laser beam scanning velocity and the covering of scanning lines can significantly influence the ablation process. Laser pulse can vary over a wide range of durations (milliseconds to femtoseconds) and fluxes, and can be precisely controlled. The simplest application of laser ablation is to remove material from the seat belt webbing in a controlled fashion; very short laser pulses remove material so quickly that the surrounding material absorbs very little heat. The technique of ablating the seat belt webbing surface with a laser has advantages including high speed operation, easily automated operation, low cost, high precision, local treatment, and minimal target heating.

Types of lasers that can be used for ablating the set belt surface in the present disclosure include, but are not limited to, helium-neon lasers, argon lasers, krypton lasers, xenon ion lasers, nitrogen lasers, carbon dioxide ($CO_2$) lasers, carbon monoxide lasers, excimer lasers, hydrogen fluoride lasers, deuterium fluoride lasers, chemical oxygen-iodine lasers, all gas-phase iodine lasers, dye lasers, ruby laser, yttrium-aluminum-garnet (YAG) lasers (e.g. YAG and any of Nd, Cr, Er, Y, Ca, glass, Th, Yb, Ho), and the like. In a preferred embodiment, the seat belt webbing is ablated by directing a laser beam produced by a $CO_2$ laser onto the webbing surface. In one embodiment, the $CO_2$ laser produces a laser beam of infrared light having an operation wavelength of 1 micron or greater, such as from 1 micron to 25 microns, from 1 micron to 12 microns, or from 5 microns to 12 microns. The laser beam produced by the $CO_2$ laser has a diameter of at least 100 µm, at least 150 µm, at least 200 µm, up to 400 µm.

The ablating can be performed by directing a laser beam produced by a laser with a pulse frequency of 1200 Hz, or greater, such as 1200 to 5000 Hz, such as 1200 to 1800 Hz, or 1200 to 3000 Hz onto the seat belt webbing. As used herein, pulse frequency refers to a measure of the number of cycles of emitted light per second, with each cycle of emitted light ("on time") being separated by intermittent "off time." As used herein, duty indicates the on/off ratio of the laser beam for every one cycle. A higher duty indicates that the laser has a higher ratio of "on time" compared to "off time." In the present method, the laser may have a duty of 20 to 90%, 30 to 80%, 40 to 70%, or 45 to 65%.

The seat belt webbing can be ablated with a laser beam having a power in the range of 1.5 kW or greater, such as 1.5 to 2.5 kW, 1.6 to 2.4 kW or 1.7 to 2.3 kW. In some embodiments, the seat belt surface can be ablated with a laser beam with a scanning speed of 0.01 ms' or greater, such as in the range of 0.01 to 5 $ms^{-1}$, from 0.05 to 1 $ms^{-1}$, from 0.05 to 0.5 $ms^{-1}$, or from 0.05 to 0.2 $ms^{-1}$. The pulse width can be 0.1 femtosecond or greater, such as 0.1 femtosecond to 5 seconds, 0.1 femtosecond to 1 second, 10 femtoseconds to 0.1 second, or 10 femtoseconds to 1 milisecond.

The seat belt webbing can be ablated with a laser beam having a penetration depth of 0.1 µm or greater, such as from 0.1 µm to 1 mm, from 0.1 µm to 0.5 mm, from 0.1 to 100 µm, from 0.1 to 10 µm, from 0.1 to 8 µm, from 0.1 to 5 µm. In some embodiments, the laser beam penetration depth is shallow in order to form ablated surfaces with a "low roughness," as well as to maintain the mechanical and structural integrity (such as tensile strength, elongation, mass, width, thickness, curvature, and colorfastness) of the seat belt webbing prior to ablation.

As used herein, surface roughness, or roughness, refers to a component of surface texture. It is quantified by the deviations in the direction of the normal vector of a real surface from its ideal form. If these deviations are large, the surface may be considered "rough" and if they are small, the surface may be considered "smooth." In some cases, the ablated seat belt webbing surface can have a surface roughness of 0.05 µm or greater, such as in the range of 0.05 to 0.80 µm.

Figure 8:
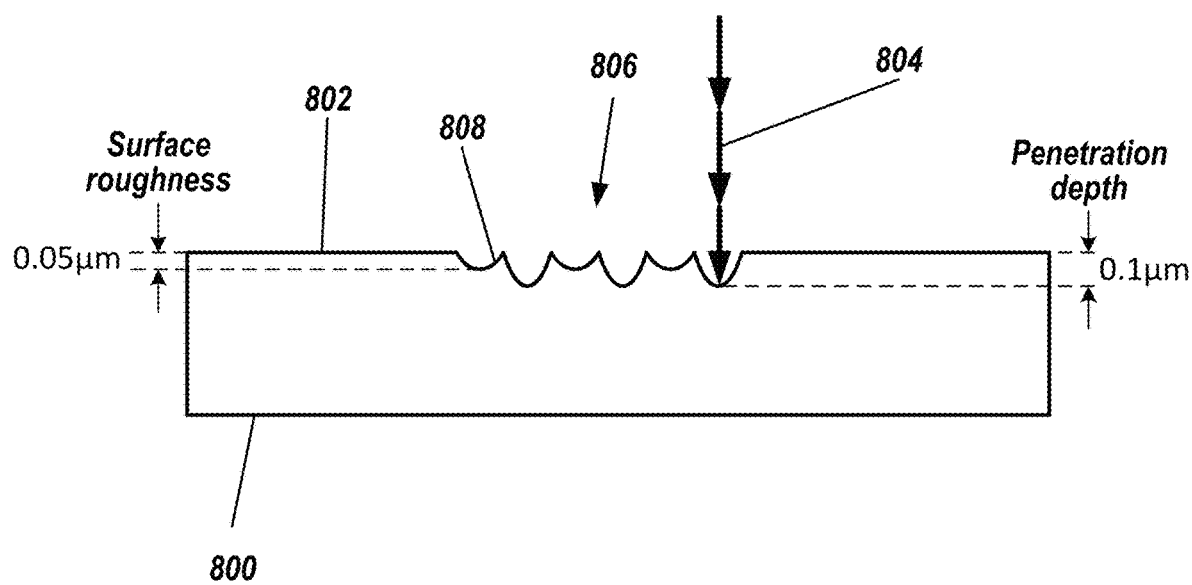
FIG. 8 is a cross section of a seat belt webbing, not drawn to scale, showing the surface roughness details, according to one implementation.

FIG. 8 shows an example cross section of a seat belt webbing 800 showing the surface roughness details. FIG. 8 is not drawn to scale—instead, the details of the surface roughness resulting from a laser-ablated surface are exaggerated for visibility. As shown, a laser pulse 804 is directed towards a surface 802 of the seat belt webbing 800 resulting in an ablated surface 806. The ablated surface 806 includes grooves 808 which are the deviations in the direction of the normal vector of the surface 802 from an ideal form. The ablated surface 806 includes a varied pattern of grooves 808 with some grooves having a depth of 0.05 µm or greater. The laser pulse 804 has a penetration depth of 0.1 µm or greater.

Preferably, the seat belt webbing maintains greater than 95% of its structural integrity after ablating with the laser.

Particularly, the seat belt webbing maintains greater than 95% tensile strength, elongation, mass, width, thickness, curvature, and colorfastness, after ablating with the laser.

The laser acts like a printer and "prints," "marks," or "burns" an ablated pattern (specified by input file) onto the seat belt webbing. The areas of the seat belt webbing exposed to the laser beam (e.g., infrared beam) is ablated at a specified position by a certain amount based on the laser power, time of exposure, and waveform used. The laser continues from position to position until the ablated pattern (e.g., pattern 408) is completely printed on the seat belt webbing. Step 702 of the method 700 can comprise directing the one or more laser pulses to ablate the seat belt webbing in a predetermined pattern.

Other means for ablating the surface of the seat belt webbing includes sandblasting or using sandpaper. For example, some portions or localized areas of the seat belt webbing are sanded to ablate the webbing surface.

Ablation results in removal of anti-abrasion and/or anti-wicking coatings that may be present on a surface of the seat belt webbing. Depending on the amount of the anti-abrasion and/or anti-wicking coating removed, the dyeing properties of the seat belt webbing will vary.

The method of marking the seat belt webbing with an infrared dye can comprise coating the ablated surface of the seat belt webbing with the infrared compound, which is shown as step 704 in FIG. 7. With laser finishing, an infrared compound can be applied onto the seat belt webbing that will appear similar to or indistinguishable from a seat belt webbing obtained using traditional processing techniques.

The infrared compound can be an infrared absorptive compound, an infrared reflective compound, or the infrared compound absorbs and reflects infrared light. The infrared compound can be provided in a carrier, such as a polymeric carrier such as a vinyl printing ink, acrylic lacquer, polyurethane, or polyurethane lacquer. To absorb or reflect a specific wavelength, the coating can have varying relative thicknesses. Alternately, the specific infrared dye can be used to absorb or reflect a specific wavelength. In some embodiments, the infrared compound can be provided as a coating that has an average absorptivity or reflectivity of at least 50%, preferably at least 70%, and more preferably at least 90%, over at least a 100 nm wide band in a wavelength region of interest. The wavelength region of interest may vary widely depending on the specific infrared compound used. The infrared coating can absorb or reflect light in the near infrared portion of the spectrum, within the range of 700 nm to 10,000 nm, or from 700 nm to 2000 nm.

The infrared compound can be coated on the ablated surface of the seat belt webbing using any suitable method. For example, the infrared compound can be applied by using a punch, rolling mill, roller, dip coating, spin coating, brush, mask, spray coating, or a combination thereof. The infrared compound can be applied in a predetermined pattern to the seat belt webbing.

The seat belt webbing maintains greater than 95% of its structural integrity after marking with the infrared compound. For example, the seat belt webbing can maintain greater than 95% of its tensile strength, elongation, mass, width, thickness, curvature, and colorfastness after marking with the infrared compound.

This disclosure also uses electromagnetic sensor(s) to detect positions of a seat belt derived from a seat belt webbing described herein and monitor (track) seat belt use within a vehicle. The term "vehicle" as used herein includes all of the broadest plain meanings for the term within the context of transportation (i.e., any references to an automobile are for example purposes only and do not limit this disclosure to any one embodiment). In one embodiment, the sensor is a video camera that is responsive to light absorbed or reflected by the seat belt after irradiation by one or more light sources. As described herein, the seat belt webbing can comprise an infrared compound that absorbs and/or reflects infrared radiation in the 700 to 10,000 nm range, which is invisible to the human eye. In one embodiment, the sensor can be an active optical 3-D imaging system which emits and is responsive to infrared light which is collocated and/or synchronized with a 2-D imager detector array where the amplitude of the detected signal is proportional to the absorbed or reflected light. For example, the image may be processed using the optical 3-D time of flight imaging system described in WO 2020/206456, which is hereby incorporated by reference in its entirety. Using well known techniques, the sensor can collect absorbed or reflected light intensity of surfaces in the field of view of the imaging system and the distance of the surface from the image detector.

In some embodiments, a camera utilizing infrared light can be used to illuminate the seat belt webbing and provide absorptive or reflective light signals back to an image sensor. The images produced by the image sensor can be applied to a video input circuit of an image processor. Analysis of the acquired electronic images can be controlled by a microcomputer. The microcomputer can also operate the infrared light control circuit which activates the infrared light source while an image is being acquired from the camera. The detected images can also be processed to construct 3-D information (intensity image and depth image) which can be used in machine vision algorithms to detect, and/or classify, and/or track information about the seat belt use within the vehicle.

In example embodiments, the image processing can determine the presence of an occupant on the vehicle seat, the size of that occupant, the proper positioning of the seat belt relative to the occupant, derive a measure of the occupant's vital signs, or a combination thereof. That distinction can be accomplished by coating the seat belt with an interchanging pattern of infrared compound. The pattern can be configured to exhibit various sizes, shape, absorptivity, or reflectivity for optimal contrast to detect/monitor the seat belt use. In cases where the seat belt may be obscured by occupant appendages, objects brought into a vehicle by the occupant, such as clothing, blankets, luggage, cargo, or anything that the occupant places over an expected area for a seat belt can be accounted for in this system. For example, the presence in the image of a pre-determined pattern can indicate the seat belt relative to the occupant within the vehicle is properly positioned. The absence in the image of a pre-determined pattern can indicate the seat belt relative to the occupant within the vehicle is improperly positioned. The absence of an image or portions of an image can indicate the seat belt is obscured.

In further examples, the images can be used in measurement and analyses to track seat belt movement. For example, the method can include comparing at least two images to determine a respiration rate of the occupant over time and determine whether the occupant has an irregular respiration rate. The occupant can be a driver and the method comprises analyzing the driver's respiration rate over time to determine whether the driver has lost the ability to continue to control the vehicle (e.g., from the driver becoming drowsy, falling asleep, stroke, heart attack, or otherwise being incapable of controlling the vehicle).

Figure 3:
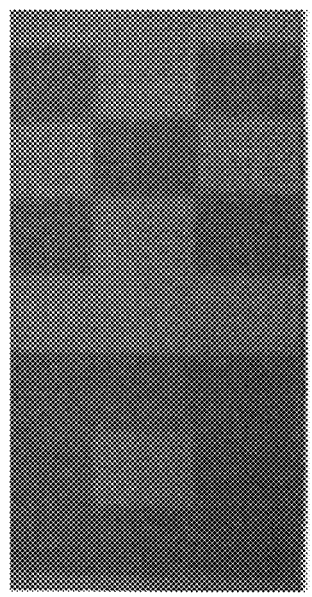
FIG. 3 is an image showing a dyed seat belt pattern having an X and a box.
Figure 5:
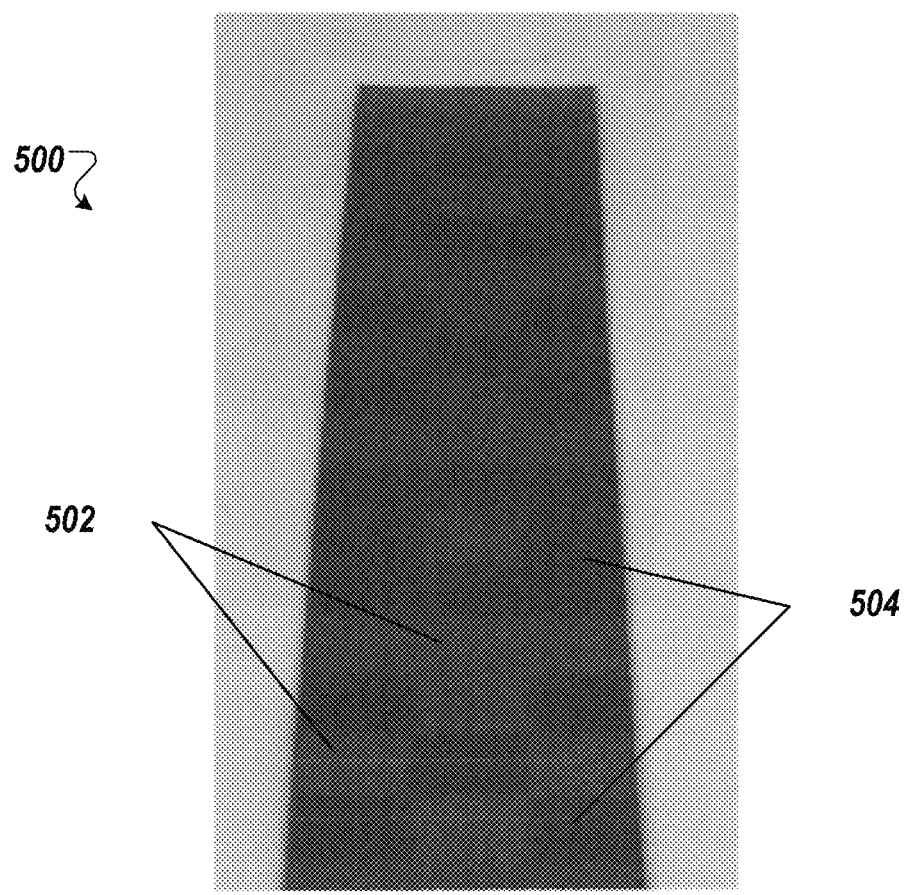
FIG. 5 is an image showing a dyed seat belt with two repeated patterns and showing the feasibility of aligning the seat belt after a single pattern is etched on the surface.

The patterns are designed of materials having a known absorptivity/reflectivity such that the pattern is distinguishable in an intensity and/or distance image taken of the vehicle interior. A pattern having a pre-determined absorptivity/reflectivity due to its material composition shows up with a distinguishable luminance sufficient to distinguish the pattern from other structures in an image. The pattern may show up in an image as either a lower luminance region or a higher luminance region at the preference of the designer and continue to be useful for detecting and monitoring seat belt use. FIGS. 3-5 show examples of belt pattern for use in monitoring seat belt use. In particular, FIG. 5 shows a dyed seat belt 500 with two repeated patterns having reflective sections 502 and absorptive sections 504. The pattern of pre-determined absorptivity/reflectivity is based upon the particular infrared compound used to dye the seat belt webbing (e.g., an infrared compound that either increases absorptivity or reflectivity of the seat belt webbing to infrared radiation).

Figure 6:
FIG. 6 is an image showing a vehicle occupant with a dyed seat belt in use in view of cameras in the vehicle.

FIG. 6 shows one example embodiment of a seat belt in use within a vehicle interior, and having an occupant therein. The image of FIG. 6 illustrates an example of one kind of image that a vehicle camera (or an appropriate system of multiple cameras) can produce from a properly tuned light source illuminating the vehicle interior. As described herein, the image may be either a two dimensional or three-dimensional image, depending on the camera, the array, and the associated computer processors, but the patterns on the seat belts, anchor points, and retractors are visible therein.

Many traits of an occupant are currently identified by an occupant classification system ("OCS") to assist in controlling air bag deployment as well as other restraint systems, alerts, and operational control signals. In non-limiting embodiments of this disclosure, images gathered pursuant to the methods and systems herein may be used in conjunction with an OCS to identify proper seat belt placement for many different levels of human development (e.g., adult, child, infant) as well as anatomy structures (large male, average male or female, small female). Optimal seat belt placement for these diverse occupants will be significantly different for each. An OCS may receive data from the computerized imaging systems described herein to conduct edge analyses to detect occupant forms, 3-D depth analyses for torso position, and anatomical dimensioning for seat belt confirmation relative to the occupant's body. Single camera and multi-camera systems for both seat belt monitoring and occupant classification are well within the scope of this disclosure. The data collected can then be used to prepare and issue associated alerts or warnings to the occupants, control air bags and other restraint systems, and update data to help an OCS verify classifications of occupants in the vehicle.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. The structures shown in the accompanying figures are susceptible to 3-D modeling and can be described relative to vertical, longitudinal, and lateral axes established with reference to neighboring components as necessary.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on networking device. In some embodiments, one or more of these features may be implemented in computer hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, computer systems described herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory) can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element. Similarly, any of the potential processing elements, modules, and machines described in this Specification should be construed as being encompassed within the broad term "processor."

The invention claimed is:

1. A method for marking a seat belt webbing with an infrared compound, comprising:
    ablating a surface of the seat belt webbing by directing one or more laser pulses toward the seat belt webbing; and
    coating the ablated surface of the seat belt webbing with the infrared compound, wherein the infrared compound increases absorptivity or reflectivity of the seat belt webbing to infrared radiation;
    wherein the one or more laser pulses have a penetration depth of 0.1 µm or greater, thereby giving the seat belt webbing a surface roughness of 0.05 µm or greater, and
    wherein the seat belt webbing maintains greater than 95% of its tensile strength after coating with the infrared compound.

2. The method of claim 1, wherein the seat belt webbing is a woven textile.

3. The method of claim 1, wherein the seat belt webbing is derived from polyamide, polyolefin, polyester, polyether, polycarbonate, polyurethane, or a combination thereof.

4. The method of claim 1, wherein the seat belt webbing comprises a pre-coat to render the seat belt webbing waterproof and/or anti-abrasive.

5. The method of claim 4, wherein the pre-coat is a polymer elastomer, further wherein the polymer elastomer comprises silicone, a polyester or polyether-based polyurethane, a polycarbonate-based polyurethane, a copolymer blend of ethylene vinyl acetate and an isocyanate, or a combination thereof.

6. The method of claim 1, further comprising directing the one or more laser pulses to ablate the seat belt webbing in a predetermined pattern.

7. The method of claim 6, wherein the infrared compound is applied in a predetermined pattern to the seat belt webbing.

8. The method of claim 1, wherein the infrared compound is an infrared absorptive compound.

9. The method of claim 1, wherein the infrared compound is an infrared reflective compound.

10. The method of claim 1, wherein the infrared compound absorbs and reflects infrared light.

11. The method of claim 1, wherein coating the ablated surface of the seat belt webbing is performed by using a rolling mill, roller, brush, mask, dip coating, spin coating, and/or spray coating.

12. The method of claim 1, wherein the infrared compound is provided in a carrier selected from vinyl printing ink, acrylic lacquer, polyurethane, or polyurethane lacquer.

13. The method of claim 1, wherein greater than one laser pulse is directed at the seat belt webbing.

14. The method of claim 1, wherein the one or more laser pulses has an operation wavelength of 1 micron or greater.

15. The method of claim 1, wherein the one or more laser pulses is directed to the seat belt webbing with a pulse frequency of 1200 Hz or greater.

16. The method of claim 1, wherein the one or more laser pulses is produced by a $CO_2$ laser.

17. The method of claim 1, wherein the one or more laser pulses is produced by a laser with a duty of 20 to 90%.

18. The method of claim 1, wherein the penetration depth is 0.1 µm to 1 mm.

19. The method of claim 1, wherein the surface roughness is 0.05 µm to 0.8 µm.

* * * * *